United States Patent
Wang et al.

(10) Patent No.: US 9,331,331 B1
(45) Date of Patent: May 3, 2016

(54) WATER-BASED BINDER FOR HIGH VOLTAGE CATHODE MATERIAL FOR LI-ION BATTERY

(71) Applicant: Applied Materials, Inc., Santa Clara, CA (US)

(72) Inventors: Fei Wang, Fremont, CA (US); Subramanya P. Herle, Mountain View, CA (US); Joseph G. Gordon, San Jose, CA (US); GirishKumar Gopalakrishnan Nair, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 60 days.

(21) Appl. No.: 13/766,558

(22) Filed: Feb. 13, 2013

Related U.S. Application Data

(60) Provisional application No. 61/598,306, filed on Feb. 13, 2012, provisional application No. 61/643,819, filed on May 7, 2012.

(51) Int. Cl.
*B05D 5/12* (2006.01)
*H01M 4/04* (2006.01)
*H01M 4/36* (2006.01)

(52) U.S. Cl.
CPC ............ *H01M 4/364* (2013.01); *H01M 4/0419* (2013.01)

(58) Field of Classification Search
USPC ............ 427/115, 122, 126.3, 383.1; 429/212, 429/218.1, 224, 231.9, 231.95; 502/524
See application file for complete search history.

(56) References Cited

U.S. PATENT DOCUMENTS

| | | |
|---|---|---|
| 6,709,788 B2 | 3/2004 | Hosokawa et al. |
| 2010/0062146 A1* | 3/2010 | Hayashi et al. ................. 427/58 |
| 2010/0062339 A1 | 3/2010 | Pan et al. |

(Continued)

FOREIGN PATENT DOCUMENTS

WO   WO 2012/013872 A1 *   2/2012

OTHER PUBLICATIONS

Lee, Jyh-Tsung et al., "A novel and efficient water-based composite binder for LiCoO$_2$ cathodes in lithium-ion batteries," J Power Sources, vol. 173, Issue 2, Nov. 15, 2007, pp. 985-989.

*Primary Examiner* — Brian K Talbot
(74) *Attorney, Agent, or Firm* — Pillsbury Winthrop Shaw Pittman LLP

(57) ABSTRACT

The present invention generally relates to using water-based binders for high voltage cathode materials, such as LMNO (spinel LiNi$_{0.5}$Mn$_{1.5}$O$_4$), in Li-ion batteries. An example of a water compatible polymer binder according to some embodiments of the present invention is a combination of CMC (carboxymethylcellulose) and a second water compatible polymer that produce coatings of adequate thickness and loading (mAh/cm$^2$). A method of forming a cathode for a Li-ion battery may include: preparing an aqueous solution of CMC; mixing together LMNO and carbon black; combining the LMNO and carbon black mixture with the CMC solution, an aqueous polyacrylic solution and distilled water, and mixing to form a slurry; coating a conductive substrate with the slurry; and drying the coated substrate, forming a cathode layer on the substrate. Furthermore, this invention describes a cathode for Li-ion batteries and tools for carrying out the above method.

18 Claims, 3 Drawing Sheets

(56) References Cited

U.S. PATENT DOCUMENTS

| | | | |
|---|---|---|---|
| 2010/0167127 A1* | 7/2010 | Cheng et al. ............ 429/221 |
| 2011/0076559 A1* | 3/2011 | Tanaka et al. ........... 429/212 |
| 2011/0143192 A1* | 6/2011 | Nakura et al. ........... 429/163 |
| 2011/0143206 A1 | 6/2011 | Muthu et al. |

* cited by examiner

WATER-BASED BINDER FOR HIGH VOLTAGE CATHODE MATERIAL FOR LI-ION BATTERY

CROSS-REFERENCE TO RELATED APPLICATIONS

This application claims the benefit of U.S. Provisional Application No. 61/598,306 filed Feb. 13, 2012, and U.S. Provisional Application No. 61/643,819 filed May 7, 2012, both incorporated herein by reference in their entirety.

This invention was made with U.S. Government support under Contract No. W15P7T-10-C-A607 awarded by the U.S. Department of Defense. The Government has certain rights in the invention.

FIELD OF THE INVENTION

Embodiments of the present invention relate generally to Li-ion batteries and more specifically to water based binders for high voltage cathode material.

BACKGROUND OF THE INVENTION

Spinel $LiNi_{0.5}Mn_{1.5}O_4$ (LMNO) material is one of the promising cathode materials for the next generation of Li-ion batteries because of the material's high voltage (4.7 V versus $Li/Li^+$), a specific capability of 147 $mAh/cm^2$ with good cycling stabilities, and good capacity retention. The binder commonly used is PVDF (polyvinylidene difluoride) dispersed in an organic solvent, typically NMP (N-methyl pyrollidone). However, organic solvents have the disadvantages of relatively high cost, negative environmental impact, flammability and toxicity.

There is a need for binders for LMNO electrode deposition that may be used without organic solvents. Fabrication of high voltage electrodes using water-based binders is described herein—water as a solvent is environmentally friendly and relatively inexpensive compared with organic solvents.

SUMMARY OF THE INVENTION

The present invention generally relates to using water-based binders for high voltage cathode materials, such as LMNO (spinel $LiNi_{0.5}Mn_{1.5}O_4$), in Li-ion batteries. An example of a water compatible polymer binder according to some embodiments of the present invention is a combination of CMC (carboxymethylcellulose) and a second water compatible polymer that produce coatings of adequate thickness (loading). The challenge is to achieve adequate coating thickness (loading), greater than 100 microns (greater than 3 mAh/$cm^2$) and higher, that exhibit good film quality, good battery cycling performance and capacity retention with LMNO. An example of the second water compatible polymer according to some embodiments of the present invention is a polyacrylic characterized as having low glass transition temperature, Tg, around 0° C. or lower, and good adhesion to Al. Some examples of suitable polyacrylics are SX-50 and SX-30, available from Gellner Industrial, and PAA, available from Sigma-Aldrich.

According to some embodiments of the present invention, a method of forming a cathode for a Li-ion battery may include: preparing an aqueous solution of CMC; mixing together LMNO and carbon black; combining the LMNO and carbon black mixture with the CMC solution, an aqueous polyacrylic solution and distilled water, and mixing to form a slurry; coating a conductive substrate with the slurry; and drying the coated substrate, forming a cathode layer on the substrate.

According to further embodiments of the present invention, a cathode for a Li-ion battery may comprising: a Li-containing cathode material; carbon black; carboxymethylcellulose (CMC); and polyacrylic; wherein the polyacrylic is characterized by a glass transition temperature, Tg, of approximately less than 0° C. Furthermore, the Li-containing cathode material may be spinel $LiNi_{0.5}Mn_{1.5}O_4$ (LMNO). Yet furthermore, the polyacrylic may be characterized by a glass transition temperature, Tg, in the range of about −20° C. to about 0° C. Furthermore, the ratio by weight of CMC to polyacrylic in the cathode layer may be in the range from about 1:1 to about 1:3.

Furthermore, this invention describes tools for carrying out the above method.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION

Figure 1:
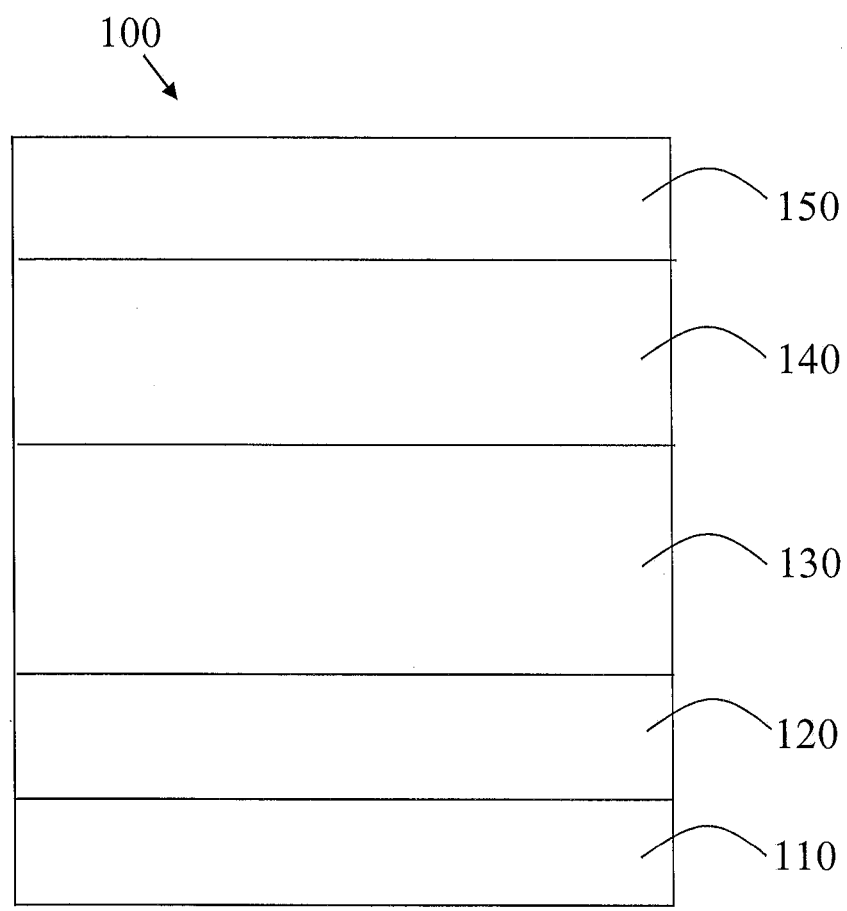
FIG. 1 is a schematic representation of a battery according to some embodiments of the present invention.

Embodiments of the present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The present invention relates generally to using water-based binders for high voltage cathode materials, such as LMNO (spinel $LiNi_{0.5}Mn_{1.5}O_4$), in Li-ion batteries. Although the examples provided herein are to LMNO, the principles and teaching of the present invention also apply to other cathode materials such as $LiCo_{1/3}Ni_{1/3}Mn_{1/3}O_2$, $LiCoO_2$, $LiFePO_4$, $LiMn_2O_4$, $LiMnO_2$, $LiNiO_2$, $LiNi_{1/2}Mn_{3/2}O_2$, $LiNi_xCo_yAl_z$, $xLi_2M'O_3 \cdot (1-x)LiMO_2$ (M'=Mn, Ti, Zr; M=Mn, Ni, Co or combinations, x<0.5), $Li_{(1+x)}M_{(1-y)}O_2$ (x, y<0.3, M=Mn, Ni, Co), $Li_2FePO_4F$, etc. (Note that the composite $xLi_2M'O_3\cdot(1-x)LiMO_2$ structures have an electrochemically inactive $Li_2M'O_3$ component integrated with an electrochemically active $LiMO_2$ component to provide improved thermal stability and improved capacity by making $Li_2M'O_3$ electrochemically active.) These cathode materials may be used to form cathodes for Li-ion batteries, such as shown schematically in FIG. 1. The Li-ion battery 100 comprises a cathode current collector 110, a cathode layer 120, an electrolyte 130, an anode layer 140 and an anode current collector 150. The cathode of the present invention may be incorporated into Li-ion batteries of varying geometries and configurations.

The challenge is to find a binder for high voltage cathode materials that is compatible with water (the commonly used binder, PVDF, is generally not soluble in water) and also suitable for forming on a conductive substrate electrode coatings of suitable thickness—in the range of 50 to 200 microns. Note that typically a coating will be in the range of 80 to 120 microns after calendaring, which equates to a range of 130 to 200 microns dry thickness before calendaring. Furthermore, the binder needs to be stable in contact with high voltage (>4.7 V) cathodes and exhibit good cycling and charge and discharge rates (>c/5). Carboxymethylcellulose (CMC) has recently begun to be used as a binder for water dispersed graphite for anodes of Li-ion cells. However, it cannot be used alone for forming LMNO cathodes because the resulting cathode film cracks on drying and shows poor adhesion to the aluminum substrate. An elastic polymer needs to be added to the cathode coating material to provide greater flexibility to the cathode layer. At the same time, the polymer added to the binder must be electrochemically stable in the operating voltage range of the battery. Styrene butadiene rubber (SBR) has been reported for water based cathodes, but is not stable at the high operating voltage of LMNO.

The present invention describes a method of forming LMNO cathode layers using a water compatible polymer binder which is a combination of CMC and a second water compatible polymer that produce coatings of adequate thickness or loading, where loading is measured in mg/cm² or mAh/cm² and is proportional to the thickness. The challenge is to achieve adequate coating thickness (loading), greater than 100 microns (greater than 3 mAh/cm²) and higher, that exhibit good film quality, good battery cycling performance and capacity retention with LMNO. The second water compatible polymer is a polyacrylic characterized as having low glass transition temperature, Tg, around 0° C. or lower, and good adhesion to Al. Note that low Tg polymers are more elastic than high Tg polymers and are suitable for combining with CMC to overcome the electrode cracking problems. Some examples of suitable polyacrylics are SX-50 and SX-30, available from Gellner Industrial, and PAA, available from Sigma-Aldrich, of which the SX-50 exhibits the best overall performance. (See chart below.)

Figure 2:
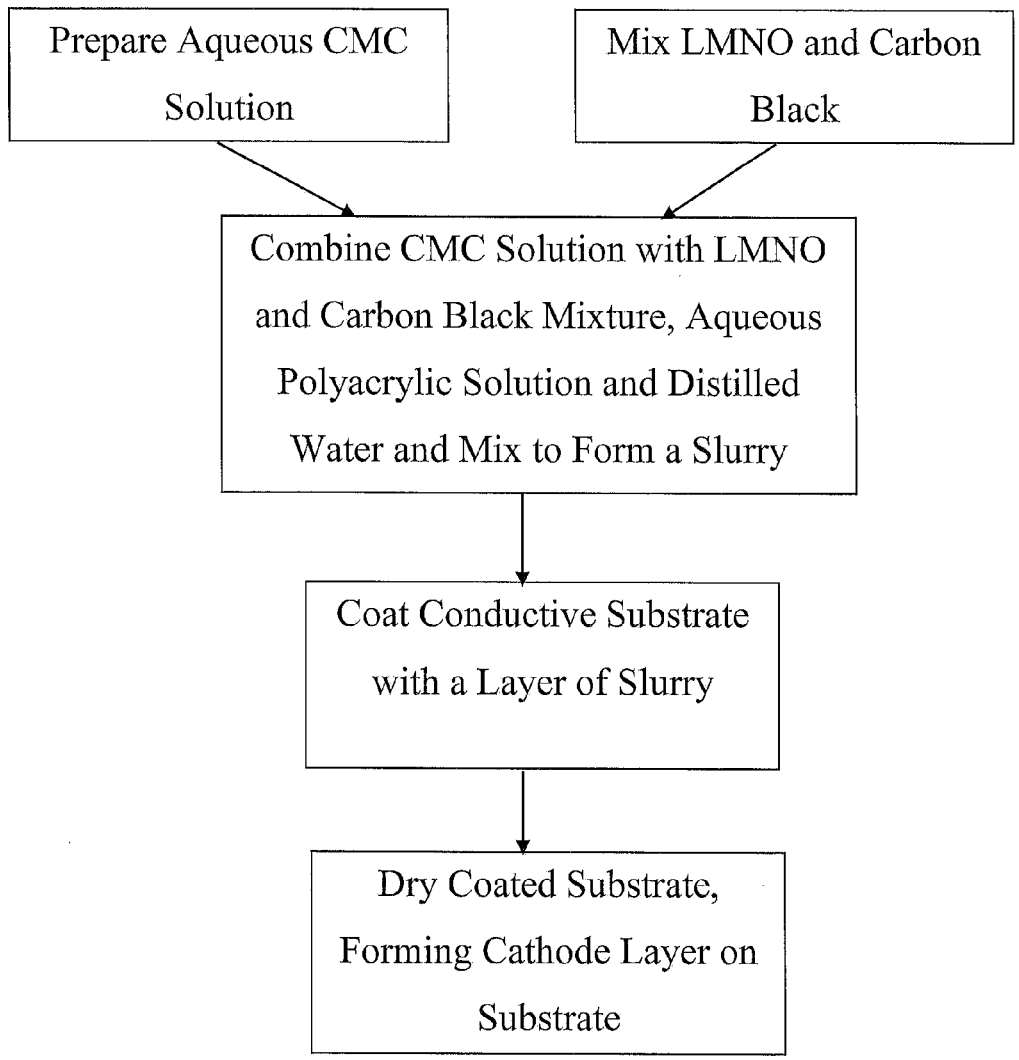
FIG. 2 is a process flow for forming a cathode, according to some embodiments of the present invention.

According to embodiments of the present invention a slurry for forming a cathode electrode layer in a thin film battery, includes an active material, such as LMNO, a conductive additive, such as carbon black, and a water-based binder. For example, the process of cathode slurry preparation may include: (1) mixing, in a non-bubbling kneader for example, a mixture of 90 weight percentage LMNO (Nanomyte™ SP-10 available from NEI Corporation) with an average particle size of 5 microns and 5 weight percent carbon black at 150 rpm for 15 minutes; (2) adding 2 weight percentage CMC (MW=250,000, available from Sigma-Aldrich Co.), 3 weight percentage SX-50 polyacrylic and sufficient water to achieve a final solid content around 50-55 weight percent; and (3) mixing the final mixture at 150 rpm for another 15 minutes. An example of the cathode preparation process is shown in the process flow of FIG. 2.

A cathode electrode was formed by doctor blade coating an aluminum charge collector with a thick slurry, prepared as described above. The thickness of the coating is chosen to achieve specific active material loading, say 2.5-3 mAh/cm² requirements. The cathode electrode was dried at 80° C. in an oven for 12 hrs. and cut, calendered and assembled in a thin film battery, such as shown in FIG. 1. The LMNO coating made with the new water based binder shows no cracking, as determined by both visual inspection and scanning electron microscopy, and has good adhesion on the Al substrate at loadings up to 4.0 mg/cm². The coating shows good capacity, capacity retention and electrochemical performance upon cycling at C/10 and C/5. (The following electrolyte was used in cell testing: 1:1 ratio of ethylene carbonate (EC) and ethylene dicarbonate (EDC), 1.0 M $LiPF_6$ with 2% fluoroethylene carbonate (FEC) additive.) The performance is comparable or even better than a PVDF binder cathode cast from NMP. The water-based binder system of the present invention is suitable for other active cathode materials as well, such as $LiCo_{1/3}Ni_{1/3}Mn_{1/3}O_2$, $LiCoO_2$, $LiFePO_4$, $LiMn_2O_4$, $LiMnO_2$, $LiNiO_2$, $LiNi_{1/2}Mn_{3/2}O_2$, $LiNi_xCo_yAl_z$, $xLi_2M'O_3\cdot(1-x)LiMO_2$(M'=Mn, Ti, Zr; M=Mn, Ni, Co or combinations, x<0.5), $Li_{(1+x)}M_{(1-y)}O_2$ (x, y<0.3, M=Mn, Ni, Co), $Li_2FePO_4F$, etc.

According to embodiments of the present invention, a blade coating method for preparing an LMNO cathode with a water-based binder includes: (1) dissolving carboxymethyl cellulose (CMC) (MW=250,000, available from Sigma-Aldrich Co.) in distilled water using a roller mixer to prepare a 3 wt. % CMC water solution; (2) mixing 7.12 gm. of LMNO (Nanomyte™ SP-10 available from NEI Corporation) and 0.48 gm. of Super P® conductive carbon black, available from TIMCAL Graphite & Carbon, using a non-bubbling kneader at 1500 rpm for 15 mins.; (3) adding 5.33 gm. of 3 wt. % CMC water solution, 0.53 gm. of SX-50 45% water emulsion solution from Gellner Industrial, LLC. and an additional 1.08 gm. of distilled water to the LMNO and Super P® conductive carbon black mixture; (4) mixing the final mixture at 1500 rpm for 15 mins. in the non-bubbling kneader—the resulting slurry having 55% solid content; (5) coating the slurry on 20 micron-thick aluminum foil using a blade coater with 400 micron-spaced blades, manufactured by Hohsen Corporation, Japan; (6) drying the coated electrode in the oven at 80° C. for 12 hrs.; and (7) further drying the film at 120° C. in a vacuum oven for another 12 hrs. Best results were obtained when the slurry was prepared in two steps. First the LMNO and carbon black were mixed dry. This achieves good distribution of carbon black around the LMNO. Then water, the aqueous binder solution and second component emulsion were added and the combination mixed again. Proportions are typically (by weight) 80-95% active material, 2-10% conductive additive and 2-10% binder. The ratio of CMC to other binder(s) is from 1:1 to 1:3.

According to further embodiments of the present invention, a spray coating method for preparing an LMNO cathode with a water-based binder may include: (1) preparing a slurry as described above for blade coating; (2) diluting the slurry with distilled water to 25 wt. % solid content (for the spray process, a much lower viscosity slurry than for blade coating is needed to prepare a smooth coating); (3) spraying the slurry onto a 20 micron thick aluminum foil using a conventional spray gun with air atomization, manufactured by DeVilbiss—the coating was done with a 2 ml/min. flow rate and a nozzle distance to the Al foil of 6 inches; and (4) the coated electrode was dried at 120° C. in a vacuum oven for between 12 and 20 hrs.

The chart below provides details of tests run on a variety of different polymers that were combined with CMC to form different water soluble binders-cathode material slurries were prepared with a two stage drying and wet mixing method, as described above for the CMC and SX-50 polyacrylic water soluble binder, and deposited using blade coating, as described above.

| Material Brand Name | Manufacturer | Functional Group | Results of Testing |
|---|---|---|---|
| SX-30 | Gellner Industrial | polyacrylic | works |
| SX-50 | Gellner Industrial | polyacrylic | best performance |
| Duramax ™ B-1000 | Rohm and Haas | polyacrylic | electrode cracking |
| Duramax ™ B-1022 | Rohm and Haas | polyacrylic | electrode cracking |
| PAA* | Sigma-Aldrich | polyacrylic | works with less capacity |
| Luvitec ® K 30 | BASF | polyvinyl-pyrrolidone (PVP) | capacity decay issue |
| Luvitec ® K 90 | BASF | polyvinyl-pyrrolidone (PVP) | electrode cracking |
| Luvitec ® VA 64 | BASF | polyvinyl-pyrrolidone (PVP) | capacity decay issue |
| Dispercoll ® U 42 | Bayer | polyurethane | electrode cracking |
| SBR | Targray | styrene butadiene copolymer | capacity decay issue |

*MW = 15,000, 35 wt. % in water

As can be seen from the chart, SX-50 and SX-30, available from. Gellner Industrial, and PAA, available from Sigma-Aldrich, may be suitable for combining with CMC to form the cathode binder material—the SX-50 exhibits the best overall performance. SX-30 and SX-50 have low glass transition temperatures (Tg), −20° C. and 0° C., respectively. SX-30, SX-50 and PAA (Sigma-Aldrich) have good adhesion to the Al substrate and form layers without cracking.

Figure 3:
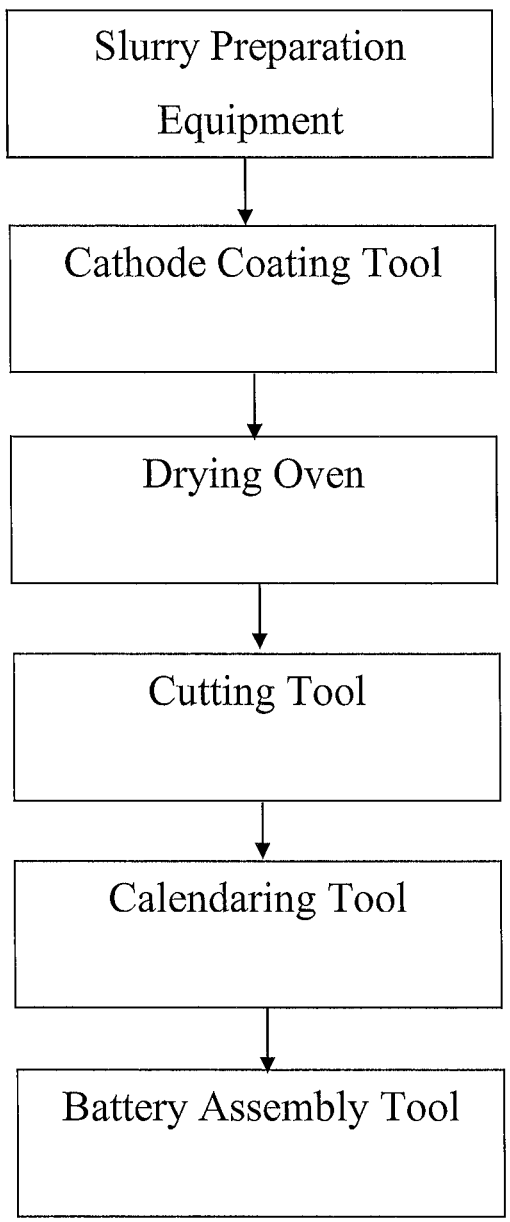
FIG. 3 is a schematic representation of equipment for forming a Li-ion battery, according to some embodiments of the present invention.

FIG. 3 shows a schematic representation of process tools for fabricating a Li-ion battery with a cathode of the present invention. The slurry preparation equipment provides the cathode material slurry with the water-based binder as described above and the equipment may include mixers such as non-bubbling kneaders. The cathode coating tool may be a blade coater, a spray coater, for example, and may be configured to coat a current collector such as an aluminum film using a roll to roll process; alternatively, separate large substrates may be coated. After coating, the cathodes are passed through a drying oven, a cutting tool and a calendaring tool, after which the completed cathodes are assembled with anodes, electrolytes, etc. to form complete Li-ion batteries. These tools may be configured for in-line processing.

Although the present invention has been described with reference to methods including blade and spray coating steps, other coating methods may also be used, such as comma, gravure and slot die.

Although the present invention has been particularly described with reference to certain embodiments thereof, it should be readily apparent to those of ordinary skill in the art that changes and modifications in the form and details may be made without departing from the spirit and scope of the invention.

What is claimed is:

1. A method of forming a cathode for a Li-ion battery comprising:
    preparing an aqueous solution of carboxymethylcellulose (CMC);
    mixing together a Li-containing cathode material and carbon black to form a first mixture;
    providing an aqueous solution of polyacrylic and water;
    combining said first mixture with said aqueous solution of CMC, said aqueous solution of polyacrylic and said water, and mixing to form a slurry;
    coating a conductive substrate with said slurry, forming a cathode layer on said conductive substrate; and
    drying said cathode layer;
    wherein the polyacrylic in said aqueous solution of polyacrylic is characterized by a glass transition temperature, Tg, in the range of about −20° C. to about 0° C.

2. The method as in claim 1, wherein said conductive substrate is an aluminum substrate.

3. The method of claim 2, wherein, after said drying said cathode layer, said cathode layer covers said substrate without cracks.

4. The method of claim 3, wherein, after said drying, said cathode layer has a thickness in the range of 130 to 200 microns before calendaring.

5. The method as in claim 1, wherein said drying includes drying under vacuum.

6. The method as in claim 1, wherein the ratio by weight of CMC to polyacrylic in said cathode layer is in the range from about 1:1 to about 1:3.

7. The method as in claim 1, further including diluting said slurry, and wherein said coating is spray coating.

8. The method as in claim 1, wherein preparing said aqueous solution of CMC includes dissolving CMC in distilled water.

9. The method of claim 8, wherein said aqueous solution of CMC is about a 3 wt. % CMC water solution.

10. The method as in claim 1, wherein said polyacrylic is a water compatible polymer.

11. The method of claim 10, wherein said aqueous solution of polyacrylic is a 45% water emulsion solution.

12. The method of claim 2, wherein said aqueous solution of polyacrylic is characterized as having good adhesion to aluminum.

13. The method as in claim 1, wherein said aqueous solution of CMC is about 2 weight percentage CMC, said aqueous solution of polyacrylic is about 3 weight percentage polyacrylic and wherein combining includes adding an amount of said water such that said slurry has a final solid content of about 55 weight percent.

14. The method as in claim 1, wherein the CMC in said aqueous solution of CMC has a molecular weight of about 250,000.

15. The method as in claim 1, wherein organic solvents are not used in said forming of said cathode.

16. The method as in claim 1, wherein said Li-containing cathode material is $LiNi_xCo_yAl_z$.

17. The method of claim 1, wherein said Li-containing cathode material is spinel $LiNi_{0.5}Mn_{1.5}O_4$ (LMNO).

18. The method of claim 17, wherein said cathode layer is configured to be electrochemically stable when operated at roughly 4.7 volts.

* * * * *

UNITED STATES PATENT AND TRADEMARK OFFICE
CERTIFICATE OF CORRECTION

PATENT NO. : 9,331,331 B1
APPLICATION NO. : 13/766558
DATED : May 3, 2016
INVENTOR(S) : Wang et al.

It is certified that error appears in the above-identified patent and that said Letters Patent is hereby corrected as shown below:

On the Title Page, in item (72), under "Inventors", in Column 1, Line 3, delete "Gordon," and insert -- Gordon II, --, therefor.

In the specification

In Column 5, Line 36, delete "from." and insert -- from --, therefor.

Signed and Sealed this
Second Day of August, 2016

Michelle K. Lee
*Director of the United States Patent and Trademark Office*